US005452203A

United States Patent [19]

Moore

[11] Patent Number: 5,452,203

[45] Date of Patent: Sep. 19, 1995

[54] METHODS AND APPARATUS FOR CORRECTING CUSTOMER ADDRESS LISTS

[75] Inventor: Wayne D. Moore, Shelton, Conn.

[73] Assignee: Pitney Bowes Inc., Stamford, Conn.

[21] Appl. No.: 983,030

[22] Filed: Nov. 30, 1992

[51] Int. Cl.[6] .......... G06F 17/00

[52] U.S. Cl. .......... 364/401; 364/464.02

[58] Field of Search .......... 364/401, 406, 464.02, 364/464.03, 478; 209/900; 235/375

[56] References Cited

U.S. PATENT DOCUMENTS

| | | | |
|---|---|---|---|
| 5,053,955 | 10/1991 | Peach et al. | 364/401 |
| 5,079,714 | 1/1992 | Manduley et al. | 364/478 |
| 5,227,970 | 7/1993 | Harris | 364/419 |

*Primary Examiner*—Gail O. Hayes
*Assistant Examiner*—Khai Tran
*Attorney, Agent, or Firm*—Robert H. Whisker; Melvin J. Scolnick

[57] ABSTRACT

Apparatus for correcting a list of addresses comprising, computer structure, structure for storing a database of postal addresses in the computer structure, structure for storing a list of shipping addresses in the computer structure, the computer structure programmed for determining whether each address stored in the shipping list storing structure and which was not previously compared to any address stored in the database storing structure compares to any address stored therein, the computer structure programmed for determining whether each postal address to which any shipping list address compares is a post office box postal address, and the computer structure programmed for storing in the shipping list storing structure said each postal address which is not a post office box postal address.

20 Claims, 2 Drawing Sheets

METHODS AND APPARATUS FOR CORRECTING CUSTOMER ADDRESS LISTS

BACKGROUND OF THE INVENTION

This invention is generally concerned with software databases of letter and parcel mailing addresses and more particularly with utilization thereof for correcting customer shipping lists.

Among the numerous software products available to the business community for use with personal computers, for expediting the implementation of complex business procedures, there are included databases of postal addresses for mailing letters or parcels to substantially all personal residences and business offices in the United States. Such software databases are known in the art as address "cleansing" or "sanitizing" databases, due to their being used by the business community to correct the addresses in their customer mailing lists to be sure that letter and parcel mail is properly and timely delivered to their customers. Aside from the customer satisfaction benefits which accrue to the business community users of such databases, as a result of avoiding slowed or failed deliveries of mail due to improper addressing, the U.S. Postal Service offers a monetary incentive to mailers who include the correct zip-plus-four code for a given mailing address on each letter mailpiece of a predetermined minimum number of letter mailpieces, known in the art as batch of mail, and a further monetary incentive to mailers who additionally print the correct bar code equivalent of the mailing address in an approved location on each of such letter mailpieces.

Given the aforesaid benefits and incentives, it is not surprising that the business community increasingly relies upon databases of mailing addresses for processing their customer lists to correct the addresses listed therein. On the other hand, due to their availability a relatively large number parcel shippers have attempted to use such databases for correcting the addresses in their customer shipping lists as well as their customer mailing lists. As a result, customer shipping lists having become contaminated with incorrect addresses, primarily due to the databases including mailing addresses which include Post Office Boxes to which parcel shipments cannot be made.

For example, assuming a shipper's customer shipping list includes the address "Pitney Bowes Inc., 35 Waterview Drive, Shelton, Conn. 06484", and the shipper attempts to sanitize its shipping list in order to add the zip-code. In practice, the database of mailing addresses and customer shipping list are processed in a personal computer programmed to make a comparison between the respective addresses in the database and shipping list and generate a sanitized customer shipping list which includes the proper mailing address. When this occurs the sanitized shipping list will include the address "Pitney Bowes, Inc., Box 3000, Shelton, Conn. 06484-8000", since the mailing address for Pitney Bowes' 35 Waterview Drive facility is a Post Office Box and not the facility itself. Accordingly:

- an object of the invention is to provide methods and apparatus for utilizing a database of letter and parcel mailing addresses for cleansing both customer mailing and shipping lists;
- another object is to provide methods and apparatus for selectively using a database of letter and parcel mailing addresses, and an auxiliary list of parcel shipping addresses, for use in cleansing a customer shipping addresses list; and
- another object is to provide methods and apparatus for selectively using a database of letter and parcel mailing addresses for cleansing either a customer mailing addresses list or customer shipping addresses list.

BRIEF DESCRIPTION OF THE DRAWINGS

As shown in the drawings, wherein like reference numerals designate like or corresponding parts throughout several views.

SUMMARY OF THE INVENTION

Apparatus for correcting a list of addresses comprising, computer means, means for storing a database of postal addresses in the computer means, means for storing a list of shipping addresses in the computer means, the computer means programmed for determining whether each address stored in the shipping list storing means and which was not previously compared to any address stored in the database storing means compares to any address stored therein, the computer means programmed for determining whether each postal address to which any shipping list address compares is a post office box postal address, and the computer means programmed for storing in the shipping list storing means said each postal address which is not a post office box postal address.

DESCRIPTION OF THE PREFERRED EMBODIMENTS

Figure 1:
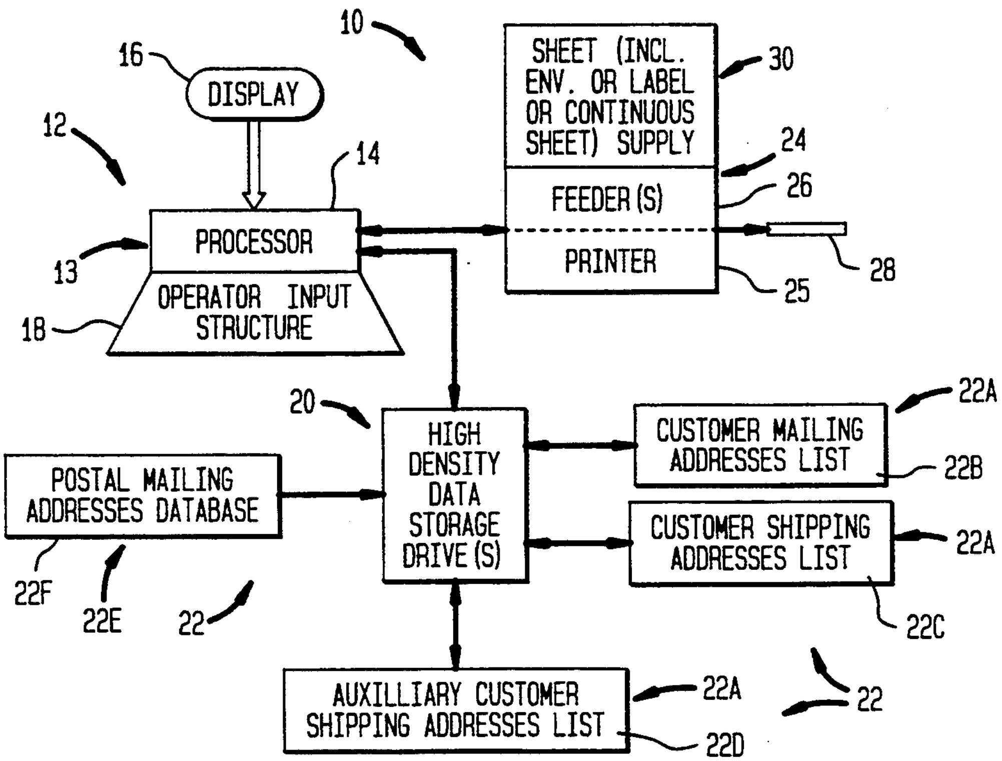
FIG. 1 is a schematic view of a system of apparatus, including a computer, according to the invention for use in storing a database of mailing addresses and a customer addresses lists, and processing the database and lists to correct the address list.

As shown in FIG. 1, the apparatus 10 according to the invention generally includes suitable computer structure 12, such as a commercially available personal computer 13, having a processor 14 and display 16, and having operator input structure 18 for permitting an operator to communicate requests or commands to the processor 14, and thus to the computer structure 12, including but not limited to any keyboard, audio or other data input structure to which the processor 14 is programmed to be responsive. In addition, the computer structure 12 preferably includes one or more conventional, mass i.e., high density, data storage drive structures 20. Moreover, the apparatus 10 comprises one or more mass data storage devices 22, including one or more floppy or hard disks 22A for storing a file, or list, 22B, of customer mailing addresses, a file or list, 22C, of customer shipping addresses and a file, or list, 22D of customer auxiliary shipping addresses and a read only memory (ROM) 22E for storing a database 22F of postal mailing addresses. Further, the apparatus 10 includes printing structure 24, which may be any type of commercially available printer 25, connected in serial or parallel communication with the processor 14, and thus to the computer structure 12, for control thereby. Preferably, the apparatus 10 also includes structure 26 for feeding a sheet 28, such as cut sheet, envelope, label or a continuous form, or the like, through the printing structure 24. Still further, the apparatus 10 includes any conventional source 30 of supply of sheets 28 for use by the printing structure 24. And, the processor 14, and thus the computer structure 12, includes the programs and routines hereinafter discussed for causing the computer structure 12 to implement the processing steps according to the invention.

Figure 2:
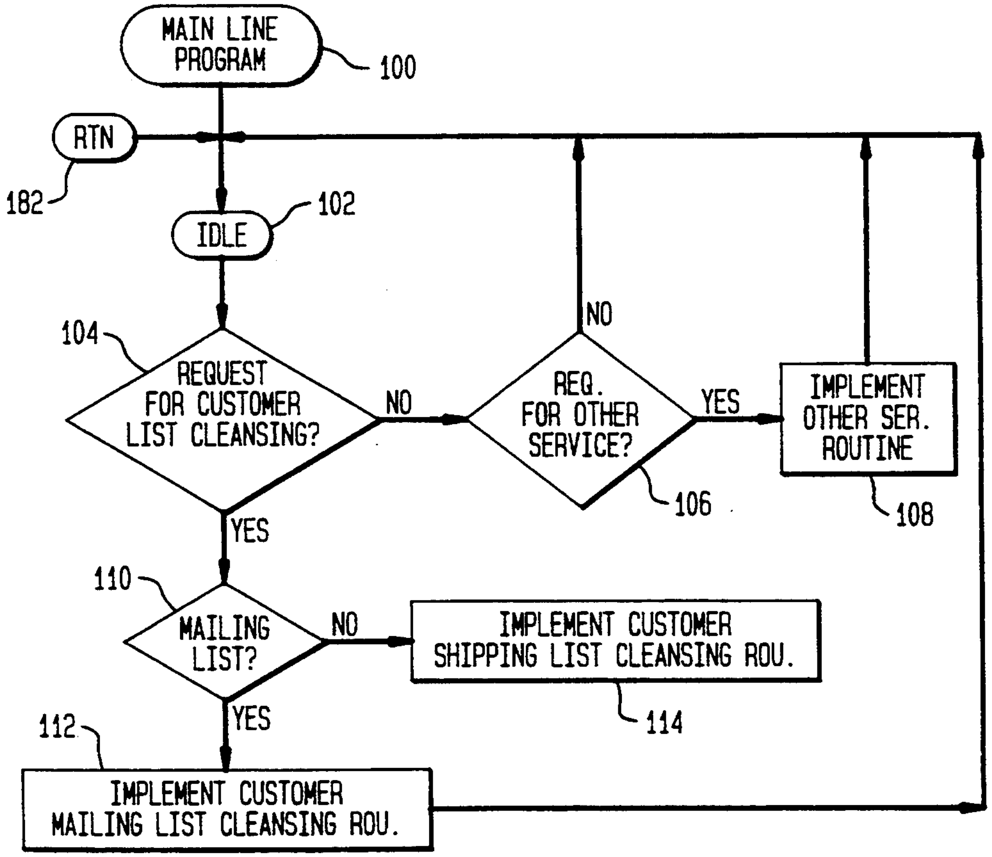
FIG. 2 is a flow chart of the main line program of the computer of FIG. 1, showing the processing steps thereof for selectively implementing either a customer mailing addresses list cleansing routine or customer shipping addresses list cleansing routine.
Figure 3:
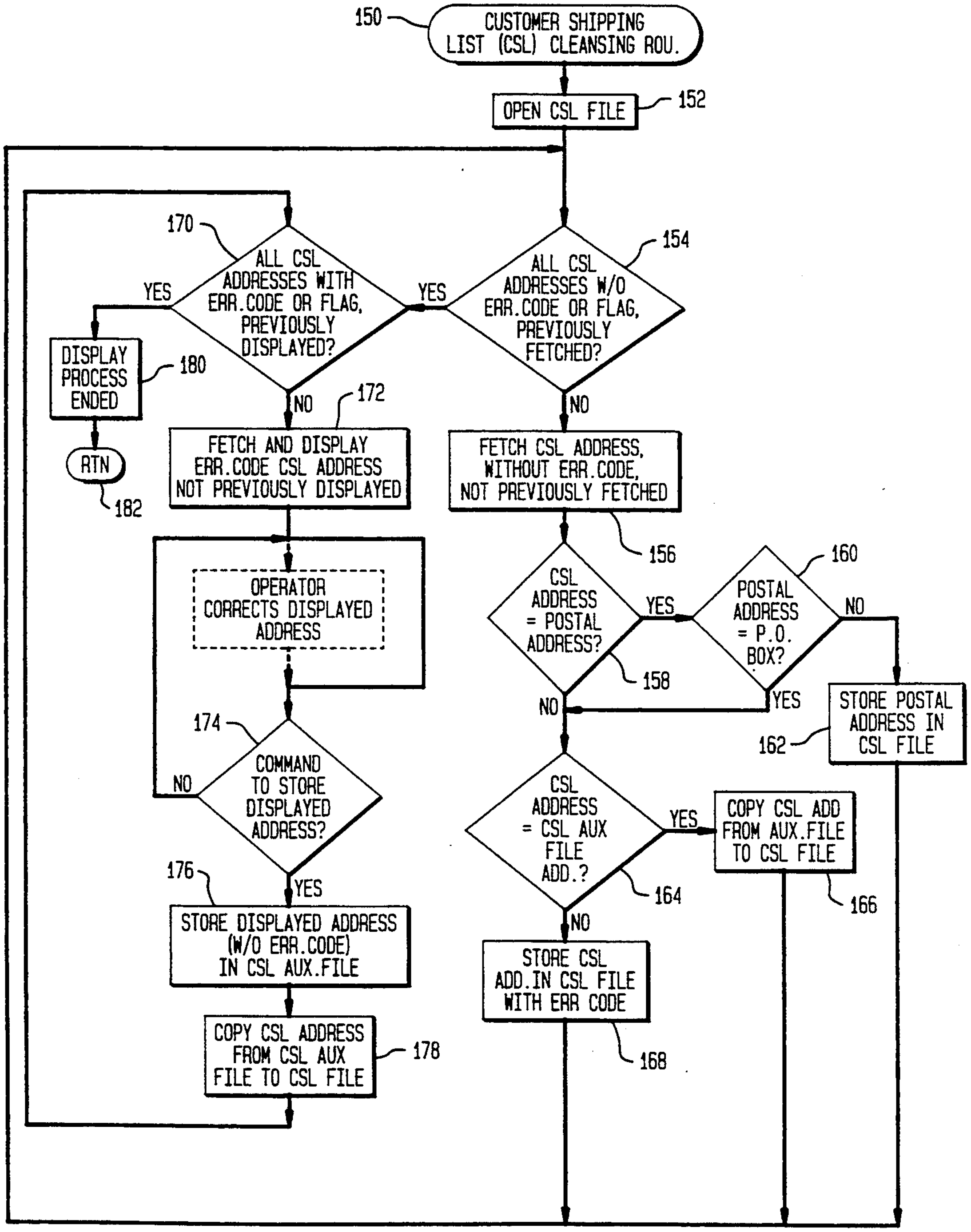
FIG. 3 is a flow chart of the customer shipping addresses list cleansing routine of FIG. 2, showing the processing steps thereof which are implemented for correcting a list of customer shipping addresses in consideration of a postal mailing addresses database and an auxiliary customer shipping addresses list.

According to the invention, the processor 14 (FIG. 1), and thus the computer structure 12, is preferably programmed to include a main line program 100 (FIG. 2), which enters an idle loop routine, step 102, when the apparatus 10 is conventionally energized, to wait for a request or command to be communicated from the operator input structure 18 (FIG. 1). Assuming a request or command for cleansing a customer list, step 104, is not received, or a request or command for any other service, step 106, is not received, the routine 100 continuously loops through steps 102, 104 and 106 until a request or command is received, step 104 or 106. Assuming the inquiry of step 104 is negatively answered and the inquiry of step 106 is affirmatively answered, then, the program 100 causes the processor 14 to execute the step 108 of calling-up and implementing the other service routine, followed by returning processing to idle, step 102. For example, assuming the other service requested or commanded, step 106, is to feed a sheet 28 from the supply 30 and print one or more addresses thereon, the main line program 100 causes the processor 14 to execute the step 108 of calling-up and implementing a conventional sheet feeding and printing routine, resulting in a sheet 28 (FIG. 1) being fed by the feeder(s) 26 from the supply 30 and to the printing structure 25, followed by the printing structure 25 printing the address(es) on the sheet 28 as the sheet 28 is fed therefrom, and returning processing idle, step 102 (FIG. 2). If however, the inquiry of step 104 is affirmatively answered, then, the routine 100 causes the processor 14 to determine whether the request or command is for cleansing a mailing addresses list, step 110. Accordingly, the program 100 requires an operator of the computer structure 12 (FIG. 1) to make a keyboard entry discriminating between a plurality of customer addresses list cleansing services, including the services of cleansing a customer mailing address list 22B or customer shipping addresses list 22C. Assuming the requested service is for cleansing a customer mailing addresses list 22B, step 60 (FIG. 2), then, the routine 100 causes the processor 14 to execute the step 112 of calling-up and implementing any conventional customer mailing addresses list cleansing routine, followed by returning processing to idle, step 102. If however the inquiry of step 110 is negatively answered, then, the routine 100 causes the processor 14 to execute the step 114 of calling-up and implementing the customer shipping addresses list routine 150 (FIG. 3).

The customer shipping addresses list cleansing routine 150 (FIG. 3) commences with the routine 150 causing the processor 14 to implement the step 152 of opening the customer shipping addresses list, i.e. CSL, file 22C (FIG. 1) followed by the step 154 (FIG. 3) of determining whether all CSL addresses listed in the CSL file 22C which do not have associated therewith an error code, or flag, were previously fetched from the CSL file 22C for comparison with the addresses in the postal mailing addresses database 22F. Assuming, as is the normal case, when the routine 150 initially causes execution of the step 152, that the determination of step 154 is negative, then, the routine 150 causes the processor 14 to execute the step 156 of fetching a CSL address which does not have an error code or flag associated therewith and which was not previously fetched. Preferably, initial execution of step 156 comprehends causing the processor 14 to fetch whatever address is stored in a first storage location of the CSL file 22C, and each successive subsequent execution of step 156 causes the processor 14 to sequentially fetch successive addresses stored in the second through last storage locations of the CSL file 22C. Having fetched the address from the first storage location of the CSL file 22C, step 156, the routine 150 then causes the processor 14 to execute the step 158 of determining whether the fetched CSL address "compares" to an address stored in the database 22F (FIG. 1) of postal mailing addresses. In this connection it is noted that for the purposes of this disclosure it is assumed that the database addresses are each correct mailing addresses and that if the CSL address includes a minor misspelling of a name or address or is partially or fully missing the zip-code, then, the CSL address will compare with the database address due to such addresses being substantially the same address. Thus, assuming that the database and a CSL addresses compare, in the sense that they are substantially the same, step 158 (FIG. 3), the routine 150 causes the processor 14 to execute the step 160 of determining whether the postal address to which the CSL address compares includes a Post Office Box (P.O. Box). Assuming as in the usual case, i.e., in substantially nine out of ten instances, that the postal mailing address does not include a P.O. Box, then, the routine 150 causes the processor 14 to execute the step 162 of storing the postal address in the file 22C of customer shipping addresses in place of the fetched CSL address which compares thereto, followed by returning processing to step 154. If however the determination made in step 158 is that the fetched CSL address is not substantially the same as an address stored in the mailing list database 22A, or that although the addresses compare, step 158, the database mailing address does include a P.O. Box, step 160, then, the routine 150 causes the processor 14 to execute the step 164 of determining whether the fetched CSL address compares to i.e., is substantially the same as, an address stored in the auxiliary customer shipping addresses list 22D (FIG. 1). Assuming the CSL address compares to an address stored in the auxiliary CSL file 22D, then, the routine 150 (FIG. 3) causes the processor 14 to execute the step 166 of copying the address found, i.e., to which the fetched CSL address compares, in the auxiliary CSL file 22D and storing the copy in the CSL file, followed by returning processing to step 154. On the other hand, if the determination made in step 164 is that the fetched CSL address does not compare to an address stored in the auxiliary CSL file, step 164, then, the routine 150 causes the processor 14 to execute the step 168 of storing the fetched CSL address in the CSL file with an error code or flag associated therewith, followed by returning processing to step 154. The routine 150 (FIG. 3) then successively causes the processor 14 to sequentially implement the foregoing processing steps 154 through 168, as appropriate, with respect to each successive address which is both listed in the CSL address file 22C and with which an error code or flag in not associated, until the inquiry of step 154 is affirmatively answered.

When the inquiry of step 154 (FIG. 3) is affirmatively answered, the routine 150 causes the processor 14 to execute the step 170 of determining whether all CSL addresses having an error code or flag associated therewith were previously fetched or displayed, or both. And, assuming that the inquiry of step 170 is negatively answered, then, the routine 150 causes the processor 14 to execute the step 172 of causing the processor 14 to fetch and display on the display 16 (FIG. 1), a CSL address which has an error code or flag associated therewith and which was not previously fetched or displayed. Thereafter, the routine 150 causes the processor 14 to execute the step 174 of determining whether or not there has been an operator entry of a request or command to store the displayed address, and, until the operator entry is made, the routine 170 continuously successively loops through step 174 until the inquiry thereof is affirmatively answered. Accordingly, the routine 170 requires the operator of the computer structure 12 to review the displayed CSL address and correct the same, for example, by calling the customer at the CSL address to determine why the CSL address is incorrect and to cure the error therein. Thus the program 150 contemplates that the operator will correct the displayed address through conventional operator input entries, after having called or otherwise validated the displayed CSL address. Whether or not the operator validates the displayed, error-coded or flagged, CSL address, upon making an entry of a request or command to store the displayed CSL address, the routine 150 causes the processor 14 to execute the step 176 of storing the displayed CSL address in the auxiliary CSL file 22D, followed by the step 178 of copying the CSL address from the auxiliary CSL file 22D and storing the copy in to the CSL file 22C in place of the error-coded or flagged CSL address. Whereupon processing is returned to step 170. Thereafter the routine 170 successively causes the processor 14 to sequentially implement the foregoing processing steps 170 through 178, as appropriate, with respect to each successive error coded or flagged address included in the CSL file 22D, until the inquiry of step 170 is affirmatively answered. Whereupon the routine 170 executes the step 130 of causing the processor 14 to display a message on the display 16, for example, indicating that the customer shipping addresses list cleansing process has been completed, followed by the step 182 of returning processing to the main line program 100 of FIG. 2.

What is claimed is:

1. Apparatus for correcting a list of postal addresses in a list of shipping addresses, comprising:
- (a) data processing means for correcting a list of postal addresses;
- (b) means for storing a database of postal addresses in the data processing means;
- (c) means for storing a list of shipping addresses in the data processing means;
- (d) the data processing means further for:
  - (i) determining whether any address stored in the shipping list storing means and which had not been compared to any address stored in the database storing means compares to any address stored in said database storing means;
  - (ii) determining whether each postal address to which any shipping list address compares is a post office box postal address; and
  - (iii) storing in the shipping list storing means said each postal address which is not a post office box postal address.

2. The apparatus according to claim 1, comprising means for:
- (a) storing a second list of addresses in the data processing means, the data processing means for determining whether each address stored in the shipping list storing means, which does not compare to any address stored in the database storing means and which was not previously compared to any address stored in the second list storing means, compares to any address stored in said shipping list; and
- (b) the data processing means programmed for storing in the shipping list storing means each address from said second address list to which any shipping list address compares.

3. The apparatus according to claim 1, including means for storing a second list of addresses in the data processing means, the data processing means for determining whether each address stored in the shipping list storing means and which was not previously compared to any address stored in said second list storing means compares to any address stored therein, and the data processing means programmed for storing in the shipping list storing means each address from said second address list to which any shipping list address compares.

4. The apparatus according to claim 1, wherein the data processing means is for copying said each postal address from said database storing means to said shipping list storing means, whereby said data processing means is programmed for storing said each postal address in said shipping list storing means.

5. The apparatus according to claim 2, wherein the data processing means is programmed for copying said each address of said second list of addresses frown said second list storing means to said shipping list storing means, whereby said data processing means is programmed for storing said each address of said second list of addresses in said shipping list storing means.

6. The apparatus according to claim 3, wherein the data processing means is for copying said each address of said second list of addresses from said second list storing means to said shipping list storing means, whereby said data processing means is programmed for storing said each address of said second list of addresses in said shipping list storing means.

7. The apparatus according to claim 2, wherein the data processing means includes a display, and the data processing means for causing the display to display each shipping list address which does not compare to any address stored in the second list storing means.

8. The apparatus according to claim 3, wherein the data processing means includes a display, and the data processing means for causing the display to display each shipping list address which does not compare to any address stored in the auxiliary list storing means.

9. The apparatus according to claim 7, wherein the data processing means includes means for permitting an operator command storage of said each displayed address in said second list storing means, and the data processing means programmed to store the displayed address in response to said operator command.

10. The apparatus according to claim 8, wherein the data processing means includes means for permitting an operator command storage of said each displayed address in said second list storing means, and the data processing means programmed to store the displayed address in response to said operator command.

11. The apparatus according to claim 1, wherein the program for storing said each postal address stores said each postal address in the shipping list storing means in place of the shipping list address which compares thereto.

12. The apparatus according to claim 2, wherein the program for storing said each address of said second list of addresses stores said each address in the shipping list storing means in place of the shipping list address which compares thereto.

13. The apparatus according to claim 3, wherein the program for storing said each address of said second list of addresses stores said each address in the shipping list storing means in place of the shipping list address which compares thereto.

14. The apparatus according to claim 1 including means for storing a list of mailing addresses in the data processing means, and the data processing means for causing an operator to selectively choose implementation of either one of a process for correcting the mailing addresses list and a process for correcting the shipping addresses list.

15. Apparatus for correcting a list of addresses comprising:

(a) data processing means for correcting a list of addresses including a display;

(b) means for storing a database of postal addresses in the data processing means;

(c) means for storing a list of shipping addresses in the data processing means;

(d) the data processing means for:

(i) comparing respective addresses stored in the database storing means with addresses stored in said shipping list storing means;

(ii) storing each postal address in said data base storage means which compares to any shipping list address in the shipping list storing means in place of the shipping list address which compares thereto if the postal address is not a post office box;

(iii) causing the display to display each shipping list address which is a post office box, the data processing means including means for permitting an operator to command storage of said each displayed address; and (iv) storing each successive displayed address in the shipping list storing means in response to each successive operator command.

16. The apparatus according to claim 15 including means for storing an address in a second list of addresses, and the data processing means for comparing each shipping list address which does not compare to any postal address with said each address of said second list of addresses and storing in the shipping address storing means each address of said second list of addresses which compares.

17. The apparatus according to claim 15, wherein the data processing means is for copying said each postal address which compares from the database to the shipping list, whereby said each postal address is stored in said shipping list storing means.

18. The apparatus according to claim 16, wherein the data processing means is for copying said each address of said second list of addresses to the shipping address list, whereby said each address of said second list of addresses is stored in said shipping list storing means.

19. The apparatus according to claim 16, wherein the data processing means is programmed for storing said each displayed address in said second list of addresses list storing means and copying said address therefrom to said shipping list storing means, whereby said each displayed address is stored in said shipping list storing means.

20. The apparatus according to claim 15 including means for storing a list of mailing addresses in the data processing means, and the data processing means for causing an operator to selectively choose implementation of either one of a process for correcting the mailing addresses list and a process for correcting the shipping addresses list.

* * * * *